Sept. 19, 1961      W. L. HALL      3,000,372
FIELD COOK STOVE
Filed Sept. 6, 1960      2 Sheets-Sheet 1
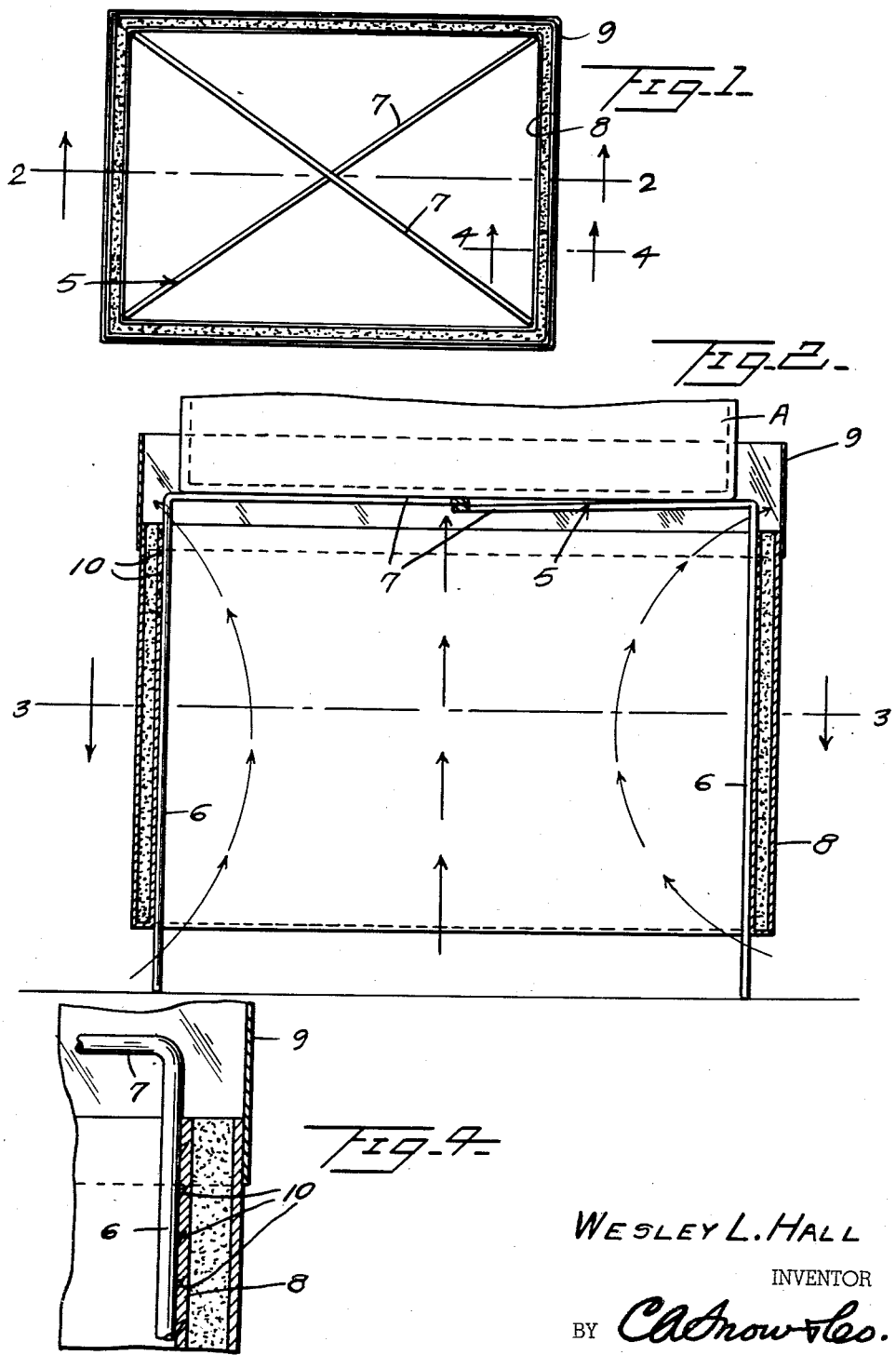
WESLEY L. HALL
INVENTOR Sept. 19, 1961 W. L. HALL 3,000,372
FIELD COOK STOVE
Filed Sept. 6, 1960 2 Sheets-Sheet 2
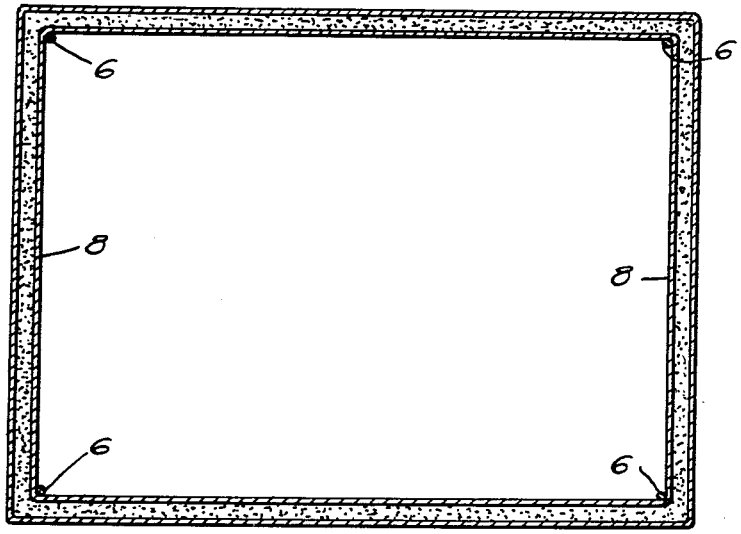
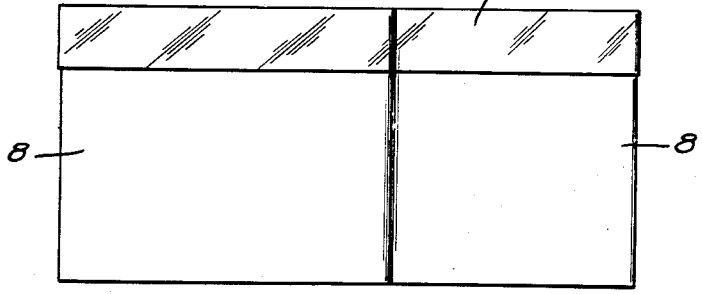
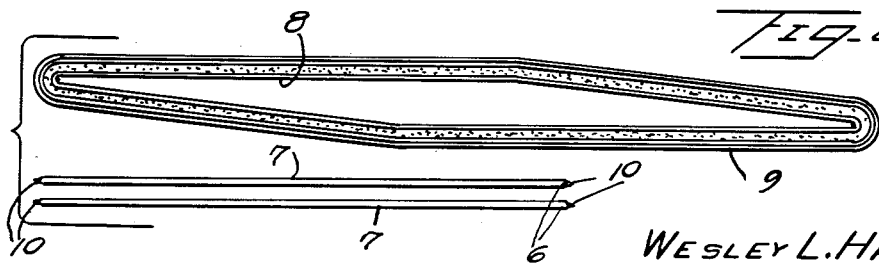
WESLEY L. HALL
INVENTOR
BY CA Snow & Co.
ATTORNEYS.

United States Patent Office 3,000,372
Patented Sept. 19, 1961

3,000,372
FIELD COOK STOVE
Wesley L. Hall, Box 211, Martin, Ky.
Filed Sept. 6, 1960, Ser. No. 54,288
1 Claim. (Cl. 126—9)

This invention relates to stoves, and more particularly to cook stoves of the disposable grill type designed primarily for field use by hikers, members of the armed forces, picnickers, or the like.

An important object of the invention is to provide a cook stove embodying a disposable unit, which may be collapsed and folded into a small and compact article to facilitate storage and transportation.

A further object of the invention is to provide a portable disposable barbecue grill which may be readily and easily assembled for use, eliminating the necessity of using tools of any type.

A still further object of the invention is to provide a disposable field cook stove wherein an especially constructed fuel envelope is provided, which is so constructed and arranged that the collapsible framework of the stove will constitute a support for the fuel envelope, and at the same time the fuel envelope will operate to steady the framework of the stove.

Another object of the invention is the provision of means for supporting the fuel envelope at the selected location on the stove frame, insuring the cooking efficiency of the stove, and at the same time providing means whereby the envelope as it is burned, may be elevated to a proper position for effectively cooking articles on the stove.

Other and further objects and advantages of this invention will be hereinafter described and the novel features thereof defined in the appended claim.

In the drawings:

FIGURE 1 is a plan view of a field cook stove, constructed in accordance with the invention.

FIGURE 2 is a sectional view taken on line 2—2 of FIGURE 1.

FIGURE 3 is a sectional view taken on line 3—3 of FIGURE 2.

FIGURE 4 is a fragmental sectional view taken on line 4—4 of FIGURE 1.

FIGURE 5 is a plan view of the fuel envelope in a folded condition.

FIGURE 6 is an exploded view illustrating the folded fuel envelope and the wire sections forming the frame of the stove.

Referring to the drawings in detail, the stove embodies a pair of inverted U-shaped wire members indicated generally by the reference character 5, the construction of the members 5 being such that they provide leg members 6 and grill sections 7 connecting the leg members, the U-shaped leg members when in use, being positioned in a manner as shown by FIGURE 2 of the drawings, wherein the leg members rest on a supporting surface, while the grill sections 7 are transversely crossed at points intermediate their ends, as better shown by FIGURE 1 of the drawings.

It might be here stated that these U-shaped wire members will be so positioned when in use that a certain amount of tension will be provided between the grill sections 7 to hold them closely together against vibrations under use.

The reference character 8 indicates an envelope which is of a size so that when it is opened to the position as shown by FIGURE 1 of the drawings, the envelope will closely fit over the leg portions of the inverted U-shaped members 5, bracing the U-shaped members and holding the envelope in its proper position with the lower edges thereof spaced from the lower ends of the leg members 6, providing a space for air to enter as indicated by the arrows, to induce combustion of the fuel contained in the envelope 8.

As shown, the envelope is of a size so that the upper edge of the envelope will also be spaced from the grill sections 7 so that the draft of air will pass laterally between the upper edge of the envelope and the grill, so that articles contained in a receptacle, which in the present showing is indicated by the reference character 8, will be properly heated to facilitate the cooking of the articles contained therein.

Secured to and extending around the upper edge of the envelope, is a metal foil strip indicated by the reference character 9, the metal foil strip acting as a wind breaker, since it extends a substantial distance above the grill, and at the same time act as a deflecting means for deflecting the heat from the burning fuel contained in the envelope 8, towards the cooking receptacle.

It might be stated that the envelope is formed preferably of heat resisting material being treated to resist heat, up to a certain temperature, the envelope burning from its upper end, under a predetermined temperature.

Spurs 10 are formed on the leg members 6 adjacent to the upper ends thereof which spurs are designed to pierce the treated paper envelope 8, and hold the envelope in an elevated position on the frame of the stove. It will of course be understood that as the upper portion of the envelope burns, the envelope may be slid upwardly until the spurs contact the envelope and pierce the inner surface thereof, thereby holding the envelope against downward movement.

Thus it will be seen that due to the construction shown and described, I have provided a portable disposable outdoor cook stove which may be readily and easily assembled and placed in an upright position for cooking purposes.

It will further be seen that after the stove has been used, the sections of the stove may be readily disconnected and folded one upon another for further use if desired.

As shown and described an envelope containing the combustible material, it is to be understood that the type of envelope and combustible material used therein may be varied to meet various requirements of use.

In view of the foregoing disclosure, it is believed that a further description as to the operation and construction of the stove is unnecessary.

Having thus described the invention, what is claimed is:

An outdoor disposable cook stove comprising a frame embodying a pair of inverted U-shaped members, providing leg sections and connecting grill sections, said leg sections having spurs extending outwardly from the surface thereof, a fuel envelope fitted around said leg sections, the fuel envelope being pierced by said spurs, securing said envelope in an adjusted position on said leg sections, and the upper and lower ends of said envelope being spaced from the upper and lower ends respectively of said wire frame, providing passageways for the passage of air to the burning fuel envelope, at the upper end thereof.

References Cited in the file of this patent

UNITED STATES PATENTS

| 2,182,932 | Sanford | Dec. 12, 1939 |
| 2,502,434 | Creitz | Apr. 4, 1950 |

FOREIGN PATENTS

| 23,041 | Great Britain | Nov. 25, 1914 |